United States Patent
Bortolus

(10) Patent No.: US 8,651,872 B2
(45) Date of Patent: Feb. 18, 2014

(54) APPARATUS FOR DIDACTIC DENTISTRY OPERATIONS

(75) Inventor: Bruno Bortolus, San Vito al Tagliamento (IT)

(73) Assignee: Saratoga SpA, Pordenone (IT)

( * ) Notice: Subject to any disclaimer, the term of this patent is extended or adjusted under 35 U.S.C. 154(b) by 170 days.

(21) Appl. No.: 12/867,294

(22) PCT Filed: Feb. 13, 2009

(86) PCT No.: PCT/EP2009/051703
§ 371 (c)(1),
(2), (4) Date: Aug. 12, 2010

(87) PCT Pub. No.: WO2009/101174
PCT Pub. Date: Aug. 20, 2009

(65) Prior Publication Data
US 2010/0323338 A1 Dec. 23, 2010

(30) Foreign Application Priority Data
Feb. 14, 2008 (IT) ................................ MI2008A0029

(51) Int. Cl.
*G09B 23/28* (2006.01)
(52) U.S. Cl.
USPC .......................................... 434/262; 434/263
(58) Field of Classification Search
USPC ................................................. 434/263, 262
See application file for complete search history.

(56) References Cited

U.S. PATENT DOCUMENTS

| | | | |
|---|---|---|---|
| 4,311,467 A | | 1/1982 | Beach et al. |
| 4,416,634 A | | 11/1983 | Beach |
| 5,158,488 A | * | 10/1992 | Berlinghoff et al. .......... 434/263 |
| 5,433,613 A | * | 7/1995 | Berlinghoff et al. .......... 434/263 |
| 5,480,307 A | * | 1/1996 | Lang et al. ..................... 434/263 |
| 5,766,017 A | * | 6/1998 | Nevin et al. .................... 434/263 |
| 6,361,323 B1 | * | 3/2002 | Beach et al. ................... 434/263 |
| 2004/0201239 A1 | * | 10/2004 | Pellegrin, Jr. .............. 296/24.38 |
| 2006/0209038 A1 | * | 9/2006 | Nyholm ........................ 345/173 |

FOREIGN PATENT DOCUMENTS

| | | |
|---|---|---|
| DE | 2710756 A1 | 9/1978 |
| DE | 3127614 A1 | 1/1983 |
| DE | 3941333 A1 | 6/1991 |
| DE | 4203958 C1 | 7/1993 |
| JP | 09-022248 A | 1/1997 |
| KR | 10-0748269 B1 | 8/2007 |

OTHER PUBLICATIONS

International Search Report and Written Opinion issued on Sep. 9, 2009 in International Application No. PCT/EP2009/041703.

* cited by examiner

*Primary Examiner* — Xuan Thai
*Assistant Examiner* — Jerry-Daryl Fletcher
(74) *Attorney, Agent, or Firm* — Panitch Schwarze Belisario & Nadel LLP

(57) ABSTRACT

An apparatus for didactic dentistry operations comprising a base structure conformed so as to define a supporting plane raised from the floor, and a dentistry simulation apparatus pivoted to the supporting plane, so as to be able to rotate with respect to the latter between a first operating position, in which the simulation apparatus extends laterally from the bulk of the supporting plane, and a second inactive position in which the simulation apparatus is substantially comprised in the bulk of the supporting plane. The simulation apparatus is pivoted to the supporting plane in correspondence with a median zone of the latter. The supporting plane comprises a housing seating which at least partly accommodates the simulation apparatus in the inactive position thereof.

13 Claims, 3 Drawing Sheets

APPARATUS FOR DIDACTIC DENTISTRY OPERATIONS

CROSS-REFERENCE TO RELATED APPLICATION

This application is a Section 371 of International Application No. PCT/EP2009/051703, filed Feb. 13, 2009, which was published in the English language on Aug. 20, 2009, under International Publication No. WO 2009/101174 A2 and the disclosure of which is incorporated herein by reference.

FIELD OF THE INVENTION

The present invention concerns an apparatus for making didactic dentistry operations or simulations. In particular, the apparatus according to the present invention can selectively be used in a functional and effective manner both as a practical simulation platform and also as a bench or table for writing or studying.

BACKGROUND OF THE INVENTION

It is known that during didactic dentistry courses the students have to improve their knowledge in dental intervention techniques by following specific lessons and, in parallel, doing practical experiments on specific manikins which simulate the dental structure and conformation of a patient.

One requirement in this field, also in the perspective of reducing the spaces needed, is to combine a possible simulation platform, provided with a manikin, with a traditional desk or seat, where it is possible to combine in the same place both practical lessons and theory lessons or study.

Apparatuses are known in which a simulation manikin is associated with a fixed structure functioning as a table.

Normally, known apparatuses provide the manikin pivoted to the table and able to be selectively positioned, for example by means of a mechanical joint, between a first operating position, in which it extends laterally from the bulk of the table and allows the dentistry simulation intervention, and a second inactive position, in which it is substantially below the table, occupying part of the space under the table top.

In known apparatuses, in order to allow the user to sit with his/her legs under the table and use the table top as a didactic support for writing and/or reading, the manikin is mounted in a lateral zone with respect to the median axis of the table top.

With this known solution, the user is obliged in any case to use a limited part of the table, to avoid hitting his/her legs against the manikin in the inactive position.

In a condition in which a plurality of apparatuses are disposed one next to the other, the assembly of the manikin in laterally zone of the table top allows a correct use of the manikin only in simulations using two hands, that is, with only one user working.

In fact, any simulation of operations with four hands, that is, with two users simultaneously, requires equipment and spaces of the adjacent apparatus, thus causing limits to the freedom of movement of the users and use of the equipment, and therefore it cannot be performed in optimum conditions.

Furthermore, the movement of the manikin, and consequently the positioning thereof in the first and second position, is directly constrained to the possible angle of travel of the mechanical joint that connects the manikin to the table.

Therefore, any variation in one or the other of the two limit positions, or the positioning of the manikin in an intermediate condition, cannot easily be actuated.

Mechanical joints are also known that provide a plurality of intermediate positions. Such mechanical joints, however, either have positions that are predefined and therefore limited, or a manual adjustment, and therefore not precise and not repeatable, of the position of the manikin.

Furthermore, when it is in the second inactive position, remaining visible and below the top of the table, the manikin is often subject to accidental knocks.

One purpose of the present invention is to achieve an apparatus for didactic dentistry operations that allows to correctly perform simulation operations even with four hands, without compromising the convenience of use as a desk for reading and/or writing.

Another purpose of the present invention is to achieve an apparatus that allows to position the manikin in a correct and repeatable manner substantially in any position with respect to the table top.

Another purpose of the present invention is to achieve an apparatus that allows to hide the manikin from view and/or to at least partly protect it, at least when it is in its second inactive position.

The Applicant has devised, tested and embodied the present invention to overcome the shortcomings of the state of the art and to obtain these and other purposes and advantages.

SUMMARY OF THE INVENTION

The present invention is set forth and characterized in the independent claim, while the dependent claims describe other characteristics of the invention or variants to the main inventive idea.

In accordance with the above purposes, an apparatus for didactic dentistry operations according to the present invention comprises at least a base structure conformed so as to define at least a supporting plane raised from the floor, and a dentistry simulation apparatus, such as for example a manikin, pivoted to the supporting plane so as to be able to rotate with respect to the latter at least between a first operating position, in which it extends laterally from the bulk of the supporting plane, to allow the dentistry simulation, and a second inactive position in which it is substantially comprised within the bulk of the supporting plane.

According to a characteristic feature of the present invention, the simulation apparatus is pivoted to the supporting plane in correspondence with a median zone of the latter.

The supporting plane comprises a housing seating able to at least partly accommodate the simulation apparatus in its inactive position. The housing seating is conformed so that, when the simulation apparatus is in its second position, it is substantially comprised inside the thickness of the supporting plane.

With the present invention, the simulation apparatus extends in the first operating position from a median zone of the supporting plane, thus allowing a comfortable simultaneous disposition of two users at the sides of the simulation apparatus, and hence in correspondence with the two lateral zones of the supporting plane.

In this way it is possible for each user to carry out dentistry simulation operations even with four hands, correctly and with complete and autonomous freedom of movement and action, without using the spaces and equipment of adjacent apparatuses.

Furthermore, since the housing seating is conformed so as to accommodate the simulation apparatus keeping it substantially inside the thickness of the supporting plane, when the simulation apparatus is in its second position, the supporting plane substantially has no external appendices, either in the upper or lower zone.

In this way, the supporting plane can be comfortably and correctly used as the top of a didactic table, allowing the user to sit and insert his/her legs freely under the supporting plane, without any risk of knocking the simulation apparatus or other equipment.

Therefore, the present invention not only allows a correct and comfortable use in all its functions of simulation and didactics, but also guarantees sufficient protection to the simulation apparatus at least when it is in its second inactive position.

According to a variant, the base structure comprises at least two supporting columns disposed as a lateral support to the supporting plane, so as to define a conformation of the base structure substantially as a table or desk.

Advantageously, each supporting column comprises at least a technical compartment, inside which at least part of the dentistry equipment is disposed, in a removable condition, in order to carry out the simulation operations.

According to another variant, the apparatus according to the invention comprises at least a motor member, advantageously a brushless motor, kinematically connected to the simulation apparatus, so as to command and guide, in a desired manner, the rotation and stopping thereof between the first operating position, the second inactive position and possible intermediate positions.

In this way it is possible to establish, on each occasion and in a repeatable manner, any positioning whatsoever of the simulation apparatus with respect to the supporting plane, and thus to simulate a real positioning in the chair of a patient.

With this solution according to the present invention it is therefore possible to simulate with extreme reliability different and real operating conditions.

According to a variant, the apparatus according to the invention also comprises a command and control unit, of the programmed or programmable type, and able to control the activation and stopping of the motor member.

According to another variant, the supporting plane comprises on its upper surface a closing portion, for example pivoting horizontally, able to be selectively raised to allow the simulation apparatus to access or emerge from the housing seating.

According to another variant, the apparatus comprises interface means, such as for example a monitor, keyboard or other, associated with the base structure and able to allow the user to communicate with other users, or with teachers, in order to verify, in real time, that the operations being performed are correct, to impart instructions, to make corrections or other.

BRIEF DESCRIPTION OF THE DRAWINGS

These and other characteristics of the present invention will become apparent from the following description of a preferential form of embodiment, given as a non-restrictive example with reference to the attached drawings wherein.

DETAILED DESCRIPTION OF A PREFERENTIAL FORM OF EMBODIMENT

Figure 2:
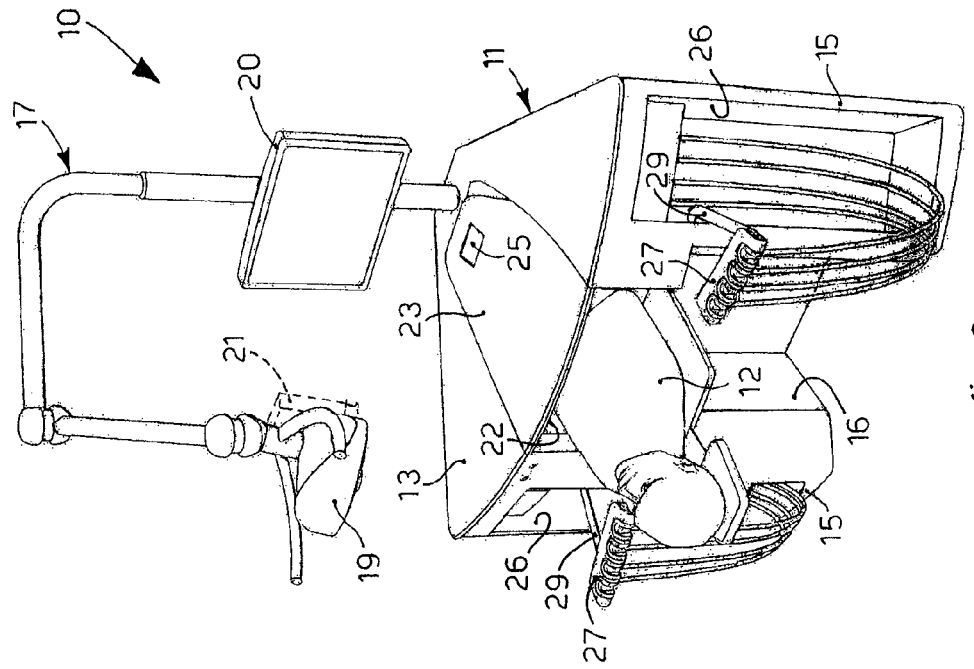
FIG. 2 is a three-dimensional view of the apparatus in FIG. 1, in a second operating condition.

With reference to the attached drawings, an apparatus 10 according to the present invention is applied as a didactic support, both to simulate dentistry operations with two or four hands, and also to follow theoretical lessons or study.

In particular, the apparatus 10 according to the present invention comprises a base structure 11 and a simulation manikin 12, on which dental prostheses are implanted so as to enable the simulation of different dentistry operations.

The base structure 11 substantially comprises a horizontal supporting plane 13, in this case substantially trapezoid in shape, and two vertical supporting columns 15, disposed in correspondence with two lateral zones of the supporting plane 13.

In this way, the supporting plane 13 is kept at a determinate height from the floor and defines below a central compartment 16, into which the user when seated can put his/her legs in order to correctly use the base structure 11 as a desk or table.

Each supporting column 15 comprises, on its height, a technical compartment 26, open toward the front of the base structure 11.

In each technical compartment 26 an equipment holder element 27 is disposed, able to support the dentistry tools necessary for the dental operations, and selectively removable from the technical compartment 26, by means of an arm 29 pivoted inside the technical compartment 26.

The supporting plane 13 also comprises a housing seating 22 made inside the thickness of the supporting plane 13 and in correspondence with a median zone thereof.

The housing seating 22 is open upward and is selectively accessible through the aperture of a horizontally pivoting portion 23 hinged to the supporting plane 13.

Figure 4:
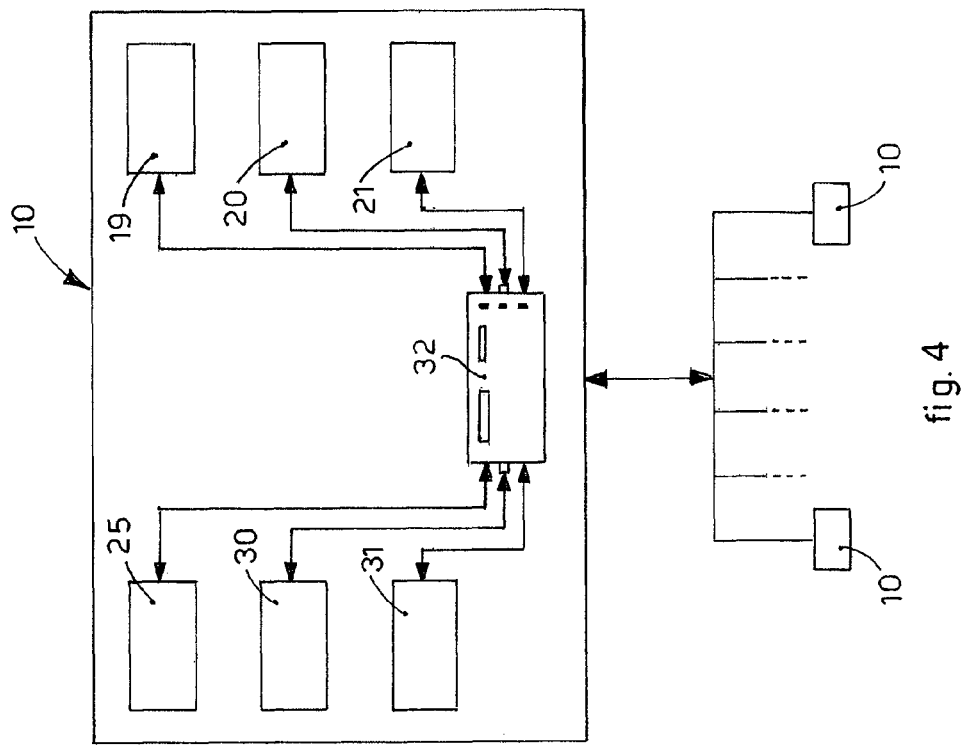
FIG. 4 is a block diagram of the functioning of the apparatus in FIG. 1.
Figure 3:
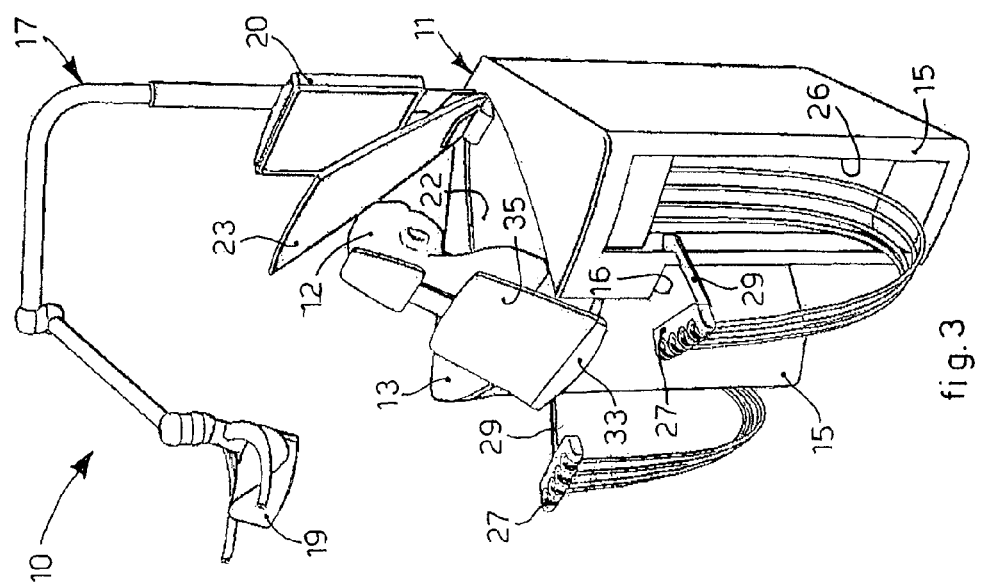
FIG. 3 a three-dimensional view of the apparatus in FIG. 1, in an intermediate operating condition.

The opening and closing of the horizontally pivoting portion 23 is automated, in this case, by means of an actuator 30, shown only schematically in the block diagram in FIG. 4, and disposed inside the base structure 11.

The horizontally pivoting portion 23, in its closed condition, defines a substantial continuity of surface and planarity with the upper surface of the supporting plane 13.

In this case, on the horizontally pivoting portion 23 an interface element 25 is provided, such as for example a keyboard, a touch screen or other, which allows the user to command the management of the apparatus 10.

In this case, the base structure 11 also comprises an articulated arm 17, extending upward from the upper surface of the supporting plane 13, and able to support, in an adjustable manner, a lamp 19. In this case the articulated arm also supports a monitor 20.

According to a variant, shown schematically by a line of dashes in FIG. 2, a control video camera 21 is also mounted on the articulated arm 17.

The simulation manikin 12 is of a substantially traditional type, and is pivoted to the supporting plane 13 in correspondence with the housing seating 22, that is, in a median zone of the supporting plane 13.

Figure 1:
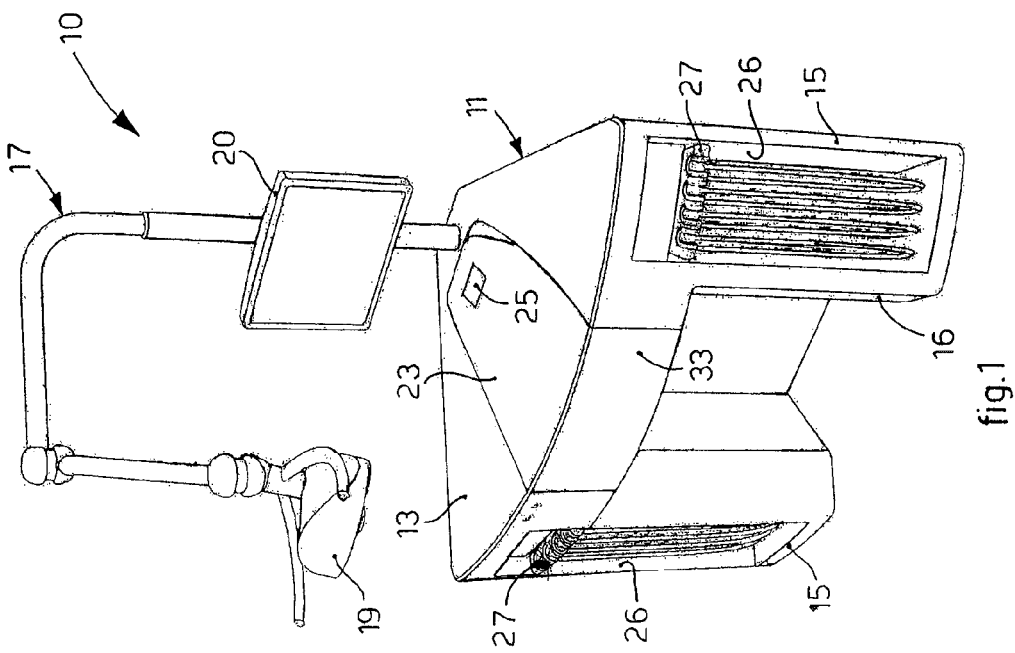
FIG. 1 is a three-dimensional view of an apparatus for didactic dentistry operations, in a first operating condition.

The simulation manikin 12 is selectively rotatable between an inactive position (FIG. 1) in which it is completely housed inside the housing seating 22 and covered by the horizontally pivoting portion 23, and an operating position (FIG. 2) in which it protrudes frontally from the bulk of the supporting plane 13.

In this way, in the inactive position of the manikin 12, the apparatus 10 can be used as a traditional desk or table for writing or studying, whereas in the operative position of the manikin 12 the equipment provided in both the supporting columns 15 can be comfortably used, in order to carry out correctly the simulation of operations with four hands.

In this case, the manikin 12 also comprises a closing wall 33 which, in its inactive condition, defines the median part of the front edge of the supporting plane 13. The manikin 12 also comprises on its rear part a back-rest 35 able to simulate the bulk of a possible dentist's chair.

The rotation of the manikin 12 between one of said positions and the other is automatically actuated by a brushless motor 31, as is the possible positioning in different intermediate positions.

The brushless motor 31 commands a substantially analogical rotation of the manikin 12 and can potentially cause the rotation to stop with any degree of inclination with respect to the supporting plane 13. Advantageously, a position transducer is associated with the brushless motor 31, such as for example an encoder, able to control and determine the position of the manikin 12, in order to increase the precision of movement, stoppage and repeatability of the position reached.

The apparatus 10 according to the present invention also comprises a command and control unit 32, disposed inside the base structure 11 and electronically connected to the lamp 19, the monitor 20, the video camera 21, the interface element 25, the actuator 30 and the brushless motor 31.

The command and control unit 32 is the programmed type, or selectively programmable, for example by means of the interface element 25, so as to define desired functioning parameters of the apparatus 10, such as for example the inclination of the manikin 12 in its operating position, the degree of illumination of the lamp 19, the coordinated opening of the horizontally pivoting portion 23 with respect to the rotation of the manikin 12, the switching on of the video camera 21 and/or the monitor 20, and the activation of the dentistry equipment or other.

Advantageously, the apparatus 10, and in particular the command and control unit 32, is connected in a network with other analogous apparatuses 10, so as to exchange information, allow remote interaction between several users, to display or control the work of others, or other.

This solution is applied particularly, but not exclusively, in study rooms where the teacher can monitor the students' work and possibly intervene directly to provide advice, or correct possible errors.

Figure 5:
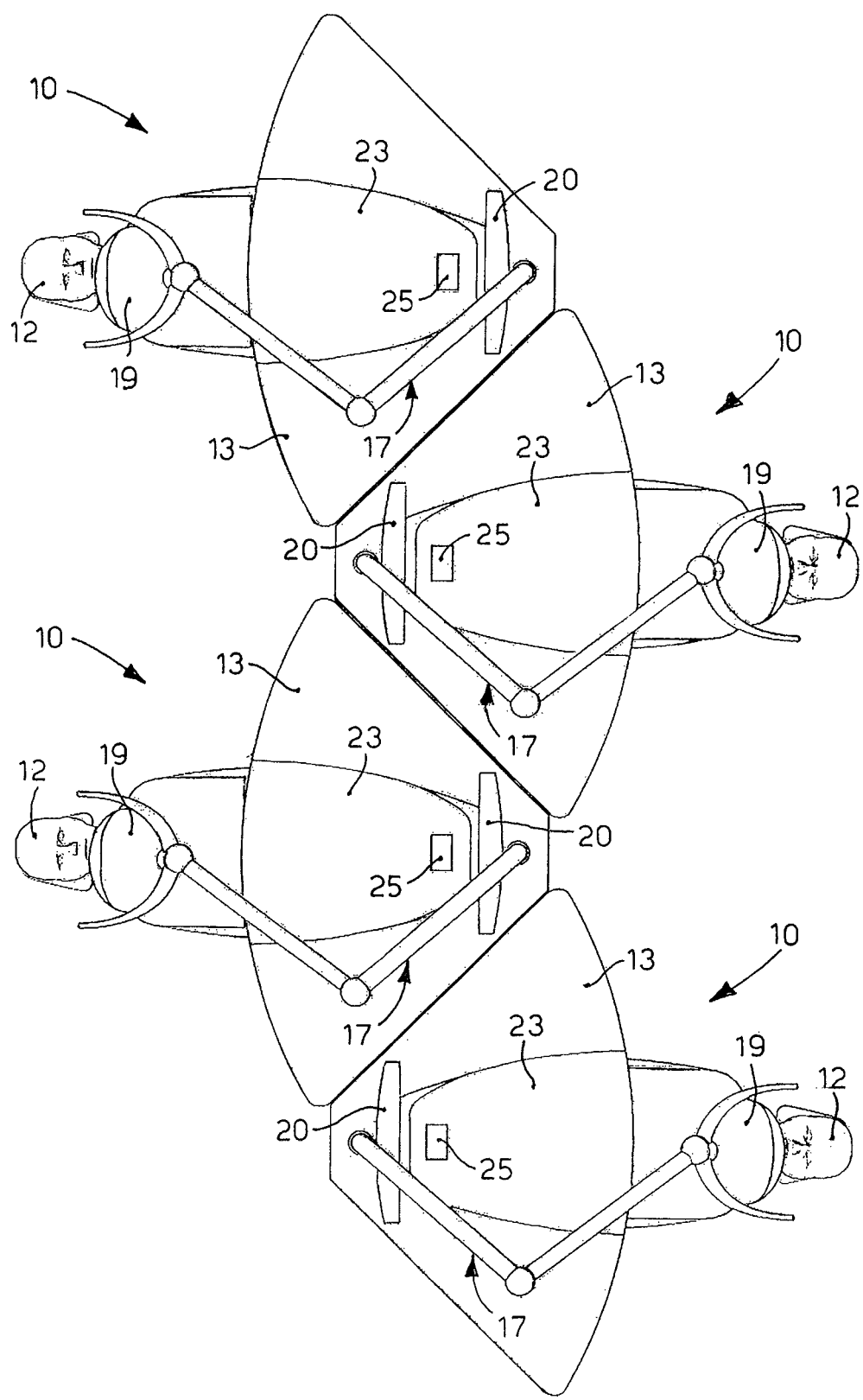
FIG. 5 is a view from above of a combination of apparatuses in FIG. 1.

FIG. 5 shows a possible combination of apparatuses 10 according to the present invention.

In this case, the apparatuses 10 are disposed in succession alternated to each other so as to substantially form a row.

It cannot be excluded that the apparatuses 10 are adjacent so as to define petals or segments of a circular conformation, a half moon, or other, depending on the shape of the supporting plane 13.

It is clear, however, that modifications and/or additions of parts may be made to the apparatus 10 as described heretofore, without departing from the field and scope of the present invention.

For example, it comes within the field of the present invention to provide that two or more manikins 12 are pivoted on a single supporting plane 13.

According to a variant, electronic control elements are provided, associated with the manikin 12 and able to guarantee the safe movement and correct positioning of the manikin 12, in its active and inactive positions.

According to another variant, where the horizontally pivoting portion 23 is not provided, the back-rest of the manikin 35 directly defines, in the inactive position, a substantial continuity of surface and planarity with the upper surface of the supporting plane 13.

According to another variant, the horizontally pivoting portion 23 is made as a shutter or other closing member, able to be selectively opened or closed to allow the manikin 12 to access or leave.

It also comes within the field of the present invention to provide that, if the supporting plane has a different shape from the one shown here, other conformations of combinations of several apparatuses 10 may be provided, depending on the specific operating and/or installation requirements.

It is also clear that, although the present invention has been described with reference to specific examples, a person of skill in the art shall certainly be able to achieve many other equivalent forms of apparatus for didactic dentistry operations, having the characteristics as set forth in the claims and hence all coming within the field of protection defined thereby.

The invention claimed is:

1. An apparatus for didactic dentistry operations comprising:
   a base structure including a supporting plane raised from the floor, two spaced-apart supporting columns extending downwardly from the supporting plane, and a central compartment positioned beneath the supporting plane and between the supporting columns, each supporting column including a technical compartment with an equipment holder element able to support dentistry tools; and
   a dentistry simulation apparatus pivotably attached to said supporting plane at a location above the central compartment, the dentistry simulation apparatus being rotatable with respect to the supporting plane at least between a first operating position, in which the simulation apparatus extends laterally from the bulk of said supporting plane, and a second inactive position in which the simulation apparatus is substantially housed in the bulk of said supporting plane, in the second inactive position the supporting plane being usable as a top of a didactic table and allowing a user to sit and insert his or her legs freely under the supporting plane and into the central compartment, in the first operating position two users being able to perform a simulation operation on opposing sides of the dentistry simulation apparatus without compromising the use of the supporting plane as a desk for each of the two users, in the first operating position one of the two users having access to one of the two supporting columns and the other of the two users having access to the other of the two supporting columns,
   said supporting plane comprising a housing seating made inside the thickness of the supporting plane in correspondence with the central compartment, and able to completely accommodate said dentistry simulation apparatus in the second position thereof,
   wherein the base structure further includes a horizontally pivoting portion pivotally attached to the supporting plane and the simulation apparatus includes a manikin and a back-rest that simulates at least a portion of a dentist's chair, at least a portion of the manikin being positioned between at least a portion of the horizontally pivoting portion of the base structure and the back-rest when the dentistry simulation apparatus is in the first operating position.

2. The apparatus as in claim 1, wherein said housing seating is conformed so that when said simulation apparatus is in said second position the simulation apparatus is substantially housed within the thickness of said supporting plane.

3. The apparatus as in claim 1, comprising at least a drive member mounted on said base structure and kinematically connected to said simulation apparatus, so as to command and guide the rotation thereof in a desired manner, and stopping thereof at the first operating position, the second inactive position, and intermediate positions therebetween.

4. The apparatus as in claim 3, further comprising a command and control unit, of the programmed or programmable type, and able to control at least said drive member.

5. The apparatus as in claim 4, wherein said command and control unit is able to be connected in a network with other command and control units of analogous apparatuses.

6. The apparatus as in claim 1, wherein said supporting plane comprises a closing portion, able to be selectively actuated in order to allow at least said simulation apparatus to access or exit from said housing seating.

7. The apparatus as in claim 6, wherein said closing portion is able to be selectively actuated by way of a relative actuator member mounted on said base structure.

8. The apparatus as in claim 7, further comprising a command and control unit, of the programmed or programmable type, and able to control at least said actuator member.

9. The apparatus as in claim 8, wherein said command and control unit is able to be connected in a network with other command and control units of analogous apparatuses.

10. The apparatus as in claim 1, comprising an interface associated with said base structure and able to allow the personalized or guided management of the apparatus by the user.

11. The apparatus as in claim 10, further comprising a command and control unit, of the programmed or programmable type, and able to control at least said interface.

12. The apparatus as in claim 11, wherein said command and control unit is able to be connected in a network with other command and control units of analogous apparatuses.

13. An apparatus for didactic dentistry operations comprising:
   at least one base structure including at least one supporting plane above a floor and two spaced-apart supporting columns extending downwardly from the supporting plane, the supporting plane being usable as a top of a didactic table and allowing a user to sit and insert legs freely under the supporting plane and between the two spaced-apart supporting columns, each supporting column including a technical compartment with an equipment holder element able to support dentistry tools; and
   a dentistry simulation apparatus pivotably attached to said supporting plane, the dentistry simulation apparatus being rotatable with respect to the supporting plane at least between a first operating position, in which the simulation apparatus extends laterally outwardly from the supporting plane, and a second inactive position in which the simulation apparatus is substantially housed in the supporting plane,
   wherein the simulation apparatus is pivotably attached to said supporting plane between the two spaced-apart supporting columns allowing simultaneous disposition of two users at either side of the simulation apparatus, the supporting plane comprising a housing seating made inside the thickness of the supporting plane in correspondence with said median zone, and being able to completely accommodate said simulation apparatus in the second position thereof, and
   wherein the base structure further includes a horizontally pivoting portion pivotally attached to the supporting plane and the simulation apparatus includes a manikin and a back-rest that simulates at least a portion of a dentist's chair, at least a portion of the manikin being positioned between at least a portion of the horizontally pivoting portion of the base structure and the back-rest when the dentistry simulation apparatus is in the first operating position.

\* \* \* \* \*